(12) United States Patent
Lo et al.

(10) Patent No.: US 9,445,472 B2
(45) Date of Patent: Sep. 13, 2016

(54) METHOD AND CIRCUIT FOR DRIVING LIGHT-EMITTING DIODES FROM THREE-PHASE POWER SOURCE

(71) Applicant: Huizhou Light Engine Limited, Huizhou (CN)

(72) Inventors: Chung Ping Kevin Lo, Hong Kong (CN); Wa Hing Leung, Hong Kong (CN); Kam Wah Siu, Hong Kong (CN)

(73) Assignee: Huizhou Light Engine Limited, Huizhou (CN)

( * ) Notice: Subject to any disclaimer, the term of this patent is extended or adjusted under 35 U.S.C. 154(b) by 0 days.

(21) Appl. No.: 14/494,231

(22) Filed: Sep. 23, 2014

(65) Prior Publication Data
US 2016/0088698 A1   Mar. 24, 2016

(51) Int. Cl.
H05B 33/08 (2006.01)

(52) U.S. Cl.
CPC ...... *H05B 33/0845* (2013.01); *H05B 33/0812* (2013.01)

(58) Field of Classification Search
CPC .......... H05B 33/0818; H05B 33/083; H05B 33/0887; H05B 33/0809
USPC ......... 315/35, 323, 188, 122, 186, 193, 294, 315/185, 200
See application file for complete search history.

(56) References Cited

U.S. PATENT DOCUMENTS

| | | | |
|---|---|---|---|
| 7,081,722 B1* | 7/2006 | Huynh et al. | 315/323 |
| 2005/0067974 A1 | 3/2005 | Trestman et al. | |
| 2011/0234092 A1* | 9/2011 | Marinus et al. | 315/35 |
| 2012/0081009 A1* | 4/2012 | Shteynberg et al. | 315/122 |
| 2015/0108909 A1* | 4/2015 | Rupp | 315/188 |

FOREIGN PATENT DOCUMENTS

| | | |
|---|---|---|
| CN | 101989817 A | 3/2011 |
| CN | 102176806 A | 9/2011 |
| CN | 102231927 A | 11/2011 |
| CN | 103716968 A | 4/2014 |
| CN | 104582138 A | 4/2015 |

(Continued)

OTHER PUBLICATIONS

Suzuki Charging Systems http://www.autodoctor.cz/SJ4131/chapter10.pdf.*

(Continued)

*Primary Examiner* — Alexander H Taningco
*Assistant Examiner* — Renan Luque
(74) *Attorney, Agent, or Firm* — Schiff Hardin LLP (57) ABSTRACT

Multiple LEDs connected in series are driven by DC voltage that is provided by a diode rectifier, the diode rectifier being connected to a three-phase power source and converting the three-phase currents from the three-phase power source into the DC voltage that is used to drive the light emitting diodes. In order to reduce ripple in the DC voltage, the series-connected light emitting diodes can be divided into a first set and a second set, and a first constant current source is provided that drives the first set, and a second constant current source is provided that drives the second set. The first and second constant current sources are both connected across the outputs of the rectifier circuit, and operate to drive the respective sets of light emitting diodes in alternation. The capability for dimming can be provided, as well as back-up single phase operation.

20 Claims, 9 Drawing Sheets

(56) References Cited

FOREIGN PATENT DOCUMENTS

| CN | 104661411 A | 5/2015 |
|---|---|---|
| JP | 2007174723 A | 7/2007 |
| JP | 2011077009 A | 4/2011 |
| TW | 201029307 A | 8/2010 |

OTHER PUBLICATIONS

Rashid, Muhammad H.. (2011). Power Electronics Handbook—Devices, Circuits, and Applications (3rd Edition). Elsevier. Online version available at: http://app.knovel.com/hotlink/toc/id:kpPEHDCAE1/power-electronics-handbook/power-electronics-handbook.*

Suzuki. Charging Systems Online version available at: http://www.autodoctor.cz/SJ4131/chapter10.pdf.*

Suzuki. Charging Systems (1996) Online version available at: http://www.autodoctor.cz/SJ4131/chapter10.pdf.*

Search report dated May 15, 2015 for Chinese Patent Application No. 201410727909.7 (with English translation).

M. Kornblit, "Power Distribution Systems for The Beijing 2008 Olympic Games", Sr. Systems Engineer, GE Beijing 2008 Olympic Games Solutions.

International Search Report dated Mar. 1, 2016 for International Application No. PCT/IB2015/002056.

* cited by examiner

METHOD AND CIRCUIT FOR DRIVING LIGHT-EMITTING DIODES FROM THREE-PHASE POWER SOURCE

TECHNICAL FIELD OF THE INVENTION

The present invention relates to driving circuitry and driving methods for operating light emitting diodes (LEDs).

BACKGROUND OF THE INVENTION

Typically, the use of LEDs as an AC powered light source requires a driver to convert AC line power to a regulated DC power for maintaining constant light output. Such an LED driver is a self-contained power supply that has output matched to the electrical characteristics, such as forward voltage and driving current, of the LED. Usually, the driver is built on an individual PCB and connects to an LED PCB which contains the array of LEDs.

Figure 1:
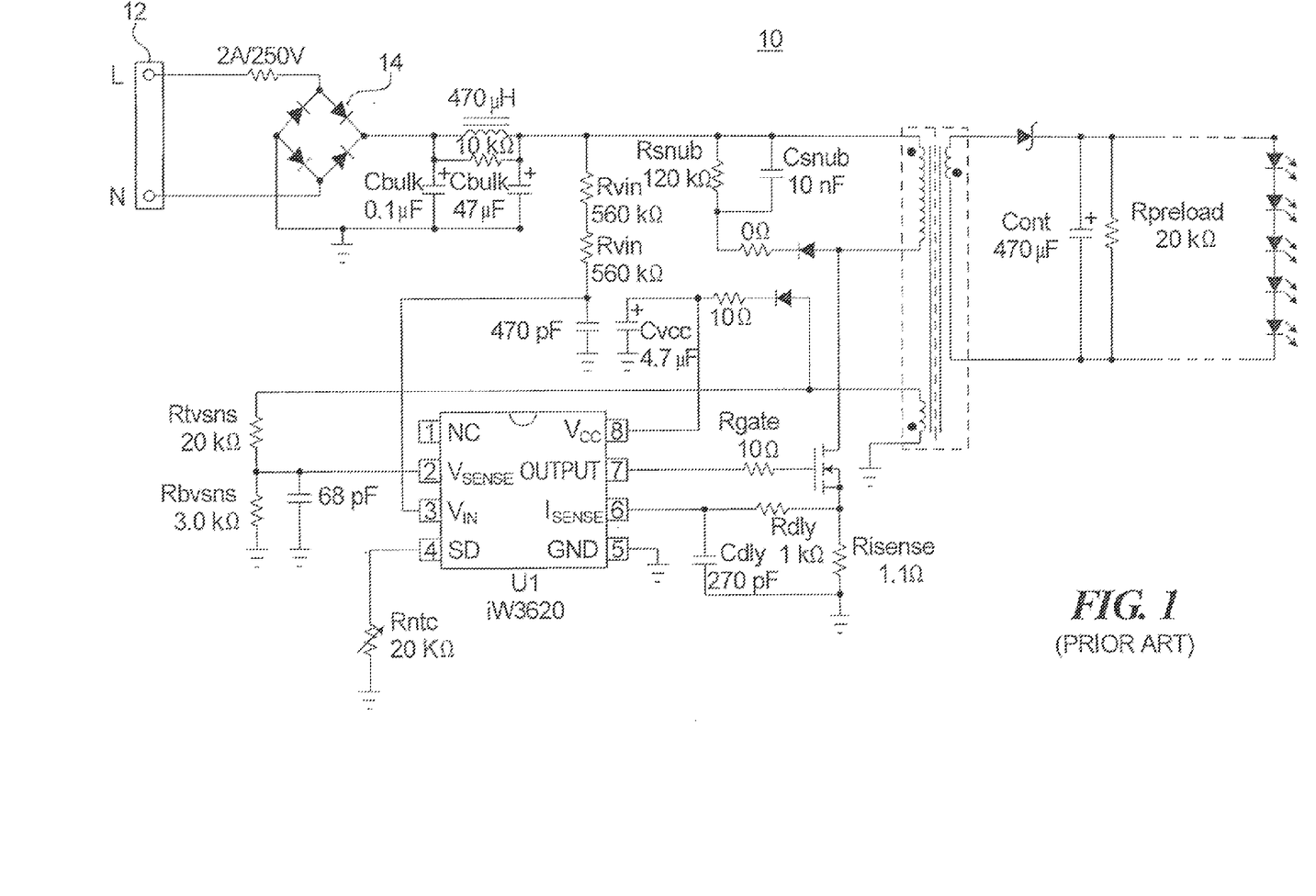
FIG. 1, as noted above, is a circuit diagram of conventional AC-DC LED driver.

FIG. 1 shows typical circuitry of an AC-DC LED driver using the known flyback converter topology. The circuitry 10 includes an AC power source 12 with live (L) and neutral (N) terminals, and a rectifier circuit 14 that converts the AC, e.g., sinusoidal, input waveform to a DC waveform, e.g., a half wave rectified waveform. The circuit operates such that when the switch Q1 conducts, current is directly drawn from the rectified sinusoid. Energy is stored in the magnetizing inductance of the primary winding of transformer T1. The rectifying Zener diode D1 is reverse biased and the LED current is supplied by the secondary capacitor Cout. When Q1 turns off, diode D1 conducts and the stored energy is delivered to the secondary winding of transformer T1 and to the output. The controller chip U1, which can be, for example an iW3620 Digital PWM Constant Current Controller for AC/DC LED Driver, manufactured by iWatt, Inc., regulates the LED current by comparing the information about the secondary output voltage and LED current, which information is reflected via the auxiliary winding of transformer T1, to a constant reference and, based on the comparison, adjusting the duty cycle of switch Q1.

AC-DC drivers such as the one shown in FIG. 1 are complex and bulky circuits. Proper electromagnetic interference filter design is needed to suppress conducted interference that is generated by the driver or by other equipment. The lifetime of such circuits is usually limited by the electrolytic capacitors used in such circuits.

Figure 2A:
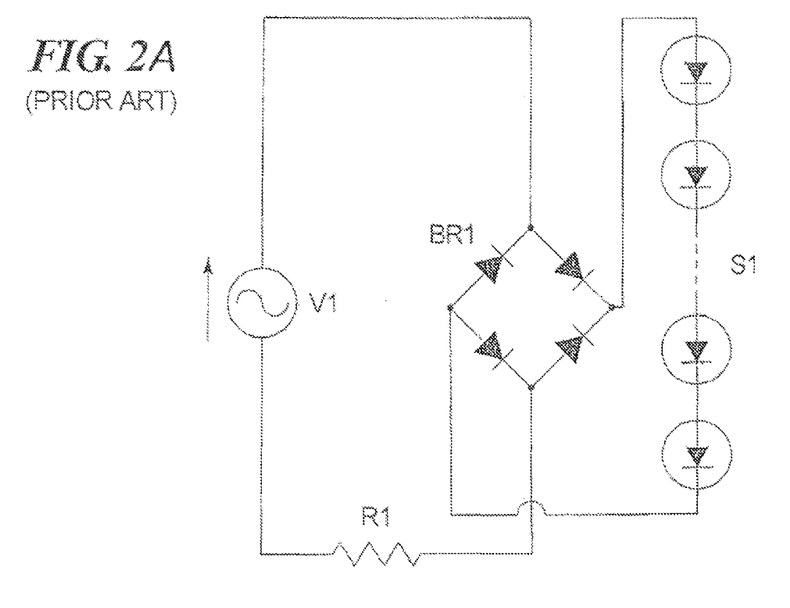
FIG. 2A, as noted above, is a circuit diagram of conventional AC-driven LED lighting.

On the other hand, LED lighting products have recently been developed in which a number of series-connected LEDs are operated with built-in LED driving circuitry that can operate from an AC power source directly. The built-in driving circuitry has an AC input connection that is configured for being received in a standard AC outlet. A disadvantage of such products, however, is that the AC line voltage is sinusoidal, and low-frequency AC LED systems conventionally operate in a rectified mode, that causes the AC-driven LED to be turned off and on at a rate that is double the line frequency. FIG. 2A schematically illustrates such a known AC-driven LED. In this known circuit, a bridge rectifier BR1 converts the AC output from a power source VI to a pulsating DC voltage, which forward biases a string S1 of series-connected LEDs, causing all of the LEDs in the string S1 to conduct, and thus emit light. A resistor R1 limits the current through the LED string S1.

Figure 2B:
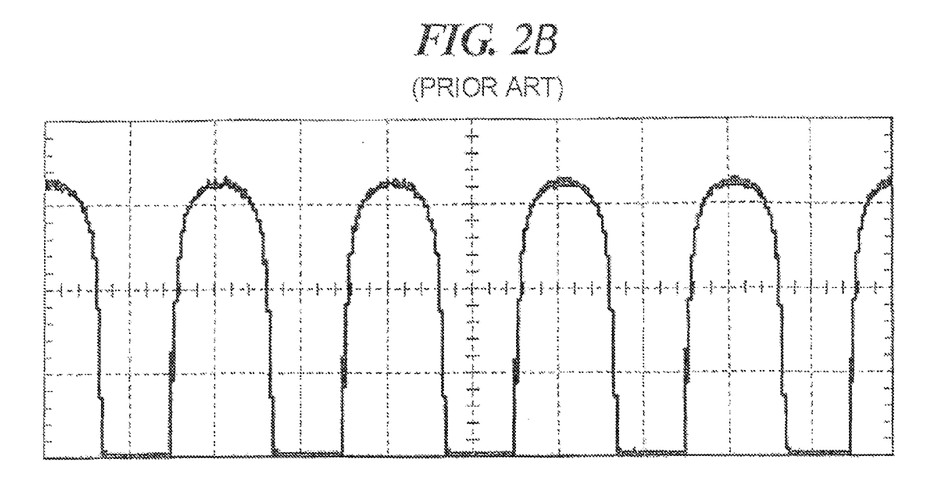
FIG. 2B, as noted above, shows the light output waveform of AC-driven LED lighting as shown in FIG. 2A.

FIG. 2B shows the light output of such an AC-driven LED. It can be seen that the overall off-time is approximately 40%. This percentage of off-time may, under some circumstances, be noticed by an observer as a flicker and can be a drawback to the acceptability of LED lighting by certain consumers.

SUMMARY OF THE INVENTION

An object of the present invention is to provide an LED lighting system and driving circuitry therein that overcome the aforementioned disadvantages of AC-driven LED lighting.

This object is achieved in accordance with the present invention by providing a driving circuit for a string of series-connected LEDs, with the driving circuit having inputs connectable to a three-phase power source. The LED lighting system according to the invention, therefore, constitutes three-phase-driven LED lighting.

To further improve regulation and efficiency of such three-phase-driven LED lighting, in a preferred embodiment the driving circuitry embodies commutating constant current sources.

The use of such commutating constant current sources for driving LEDs in a series-connected string minimizes the ripple in the drive voltage that is "seen" by the LEDs, thereby reducing the off-time and causing no notable flicker in the emitted light. Compared to conventional power supplies, the size of such three-phase power supply can be much smaller. There is no electromagnetic interference filter in the circuit. Reliability will be higher since no electrolytic capacitor is used in the circuit. The circuit is more environmental-friendly because significantly fewer components are used. The circuit is especially cost effective for high wattage power supplies as used in public area lighting, warehouses, agriculture, etc.

In an aspect of the present invention, light emitting diode (LED) drive circuitry comprises a rectifier comprising three inputs adapted for connection to a three-phase power source to respectively receive three-phase currents from said three-phase power source; said rectifier comprising a plurality of diodes connected to rectify said three-phase currents to produce a DC voltage across two outputs of said rectifier; and a plurality of LEDs connected in series across said two outputs of said rectifier, and driven by said DC voltage produced by said rectifier at said two outputs.

In a further aspect of the present invention, said LED driving circuitry comprises a resistor connected between one of said two outputs of said rectifier, and said plurality of LEDs connected in series, that limits a current provided by said rectifier to said plurality of LEDs connected in series.

In a further aspect of the present invention, in said LED driving circuitry, said plurality of LEDs comprises a first set, comprising multiple LEDs connected in series, and a second set, comprising at least one LED, said first set and said second set being connected in series to a first of said two outputs of said rectifier; and the LED driving circuitry comprises a first constant current source connected to a second of said two outputs of said rectifier and across said first set; a second constant current source connected to said second of said two outputs of said rectifier and across said second set; and said first and second constant current sources being configured to alternatingly drive said first set and said second set dependent on said voltage across said two outputs of said rectifier.

In a further aspect of the present invention, in said LED driving circuitry, said first constant current source comprises a first transistor and said second constant current source comprises a second transistor, each of said first transistor and said second transistor has a control electrode, and said LED driving circuitry comprises a constant voltage source connected to the respective control electrodes of said first and second transistors that biases said control electrodes to place each of said first and second transistors in a conducting state; and a further transistor connected to said first transistor and connected across said two outputs of said rectifier, said further transistor being configured to turn off said first transistor while said second transistor is conducting.

In a further aspect of the present invention, in said LED driving circuitry, said first and second sets have a forward voltage ratio with respect to each other of 8:1.

In a further aspect of the present invention, in the LED driving circuitry, said plurality of LEDs comprises a first set, comprising multiple LEDs connected in series, and a second set, comprising at least one LED, said first set and said second set being connected in series to a first of said two outputs of said rectifier, and said LED driving circuitry comprises: a first current source connected to a second of said two outputs of said rectifier and across said first set; a second current source connected to said second of said two outputs of said rectifier and across said second set; a variable voltage source connected across at least one of said first current source and said second current source; and said first and second current sources and said variable voltage source being configured to alternatingly drive said first set and said second set dependent on said voltage across said two outputs of said rectifier and dependent on a selected voltage produced by said variable voltage source to selectively dim at least some LEDs in said plurality of LEDs.

In a further aspect of the present invention, in the LED driving circuitry, said plurality of LEDs comprises a first set, comprising multiple LEDs connected in series, and a second set, comprising at least one LED, and said first set comprises a first subset of LEDs and a second subset of LEDs, and said first set and said second set are connected in series and said first subset is connected to a first of said two outputs of said rectifier, and said LED driving circuitry further comprises: a first current source connected to a second of two outputs of said rectifier and across said first set; a second current source connected to said second of two outputs and across said second set; a third current source connected between said first current source and a node between said first and second subsets; said rectifier comprising a fourth input adapted for connection to a neutral input; and said third voltage source being non-conducting when said rectifier receives all three of said three phase currents, and said rectifier being configured to produce a rectified voltage that causes said third circuit to be conducting when only one current is supplied to said rectifier at one of said three inputs, and said first circuit then operating said first and second subsets in a single phase mode.

In a further aspect of the present invention, in the LED driving circuitry, each of said first current source, said second current source and said third current source is a constant current source.

In a further aspect of the present invention, the LED driving circuitry further comprises a variable voltage source connected across at least said second current source, and said second current source operating at least said second subset dependent on a selected voltage produced by the variable voltage source to selectively dim at least said second subset.

In another aspect of the present invention, a method for driving light emitting diodes (LEDs), comprises connecting three inputs of a rectifier to a three-phase power source to respectively receive three-phase currents at said three inputs from said three-phase power source; in said rectifier rectifying said three-phase currents to produce a DC voltage across two outputs of said rectifier; and connecting a plurality of LEDs in series across said two outputs of said rectifier, and driving said LEDS with said DC voltage produced by said rectifier at said two outputs.

In a further aspect of the present invention, said method comprises connecting a resistor between one of said two outputs of said rectifier, and said plurality of LEDs connected in series, and with said resistor, limiting a current provided by said rectifier to said plurality of LEDs connected in series.

In a further aspect of the present invention, said method, further comprises dividing plurality of LEDs into a first set, comprising multiple LEDs connected in series, and a second set, comprising at least one LED, said first set and said second set being connected in series to a first of said two outputs of said rectifier; connecting a first constant current source to a second of said two outputs of said rectifier and across said first set; connecting a second constant current source to said second of said two outputs of said rectifier and across said second set; and with said first and second constant current sources, alternatingly driving said first set and said second set dependent on said voltage across said two outputs of said rectifier.

In a further aspect of the present invention, said first constant current source comprises a first transistor and said second constant current source comprises a second transistor, each of said first transistor and said second transistor comprising a control electrode, and said method comprises connecting a constant voltage source to the respective control electrodes of said first and second transistors, and thereby biasing said control electrodes to place each of said first and second transistors in a conducting state; and connecting a further transistor to said first transistor and across said two outputs of said rectifier and with, said further transistor, turning off said first transistor while said second transistor is conducting.

In a further aspect of the present invention, said method comprises dividing said plurality of LEDs into said first and second sets having a forward voltage ratio with respect to each other of 8:1.

In a further aspect of the present invention, the method further comprises: dividing said plurality of LEDs comprises a first set, comprising multiple LEDs connected in series, and a second set, comprising at least one LED, said first set and said second set being connected in series to a first of said two outputs of said rectifier; connecting a first current source to a second of said two outputs of said rectifier and across said first set; connecting a second current source to said second of said two outputs of said rectifier and across said second set; connecting a variable voltage source across at least one of said first current source and said second current source; and with said first and second current sources and said variable voltage source, alternatingly driving said first set and said second set dependent on said voltage across said two outputs of said rectifier and dependent on a selected voltage produced by said variable voltage source to selectively dim at least some LEDs in said plurality of LEDs.

In a further aspect of the present invention, said rectifier comprises a fourth input adapted for connection to a neutral input, and said method further comprises: dividing said plurality of LEDs into a first set, comprising multiple LEDs connected in series, and a second set, comprising at least one LED, and dividing said first set into a first subset of LEDs and a second subset of LEDs, and said first set and said second set being connected in series and said first subset being connected to a first of said two outputs of said rectifier;

connecting a first current source to a second of two outputs of said rectifier and across said first set; connecting a second current source to said second of two outputs and across said second set; connecting a third current source between said first current source and a node between said first and second subsets; via said rectifier, causing said third voltage source to be non-conducting when said rectifier receives all three of said three phase currents, and via said rectifier, producing a rectified voltage that causes said third circuit to be conducting when only one current is supplied to said rectifier at one of said three inputs, and with said first circuit, then operating said first and second subsets in a single phase mode.

In a further aspect of the present invention, the method further comprises forming each of said first current source, said second current source and said third current source as a constant current source.

In a further aspect of the present invention, the method further comprises connecting a variable voltage source connected across at least said second current source, and with said second current source, operating at least said second subset dependent on a selected voltage produced by the variable voltage source to selectively dim at least said second subset.

BRIEF DESCRIPTION OF THE DRAWINGS

The figures are for illustration purposes only and are not necessarily drawn to scale. The invention itself, however, may best be understood by reference to the detailed description which follows when taken in conjunction with the accompanying drawings in which.

DETAILED DESCRIPTION OF THE INVENTION

Figure 3:
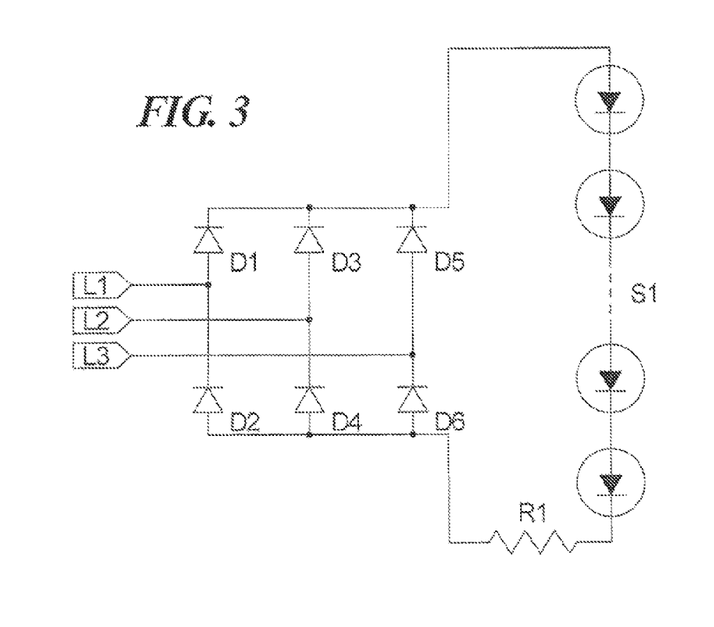
FIG. 3 is a circuit diagram of three-phase-driven LED lighting in accordance with the present invention.

FIG. 3 is a circuit diagram of a first embodiment of three-phase LED driving circuitry in accordance with the present invention. Diodes D1 through D6 form a three-phase rectifier, connected to inputs at which the three phases L1, L2 and L3 from a three-phase power source are supplied to the driving circuitry. The three-phase rectifier formed by the diodes D1 through D6 converts in the incoming signals L1, L2, and L3 into a DC voltage, which is applied across a string S1 of light emitting diodes. A resistor R1 limits the current through the LED string S1.

Figure 4:
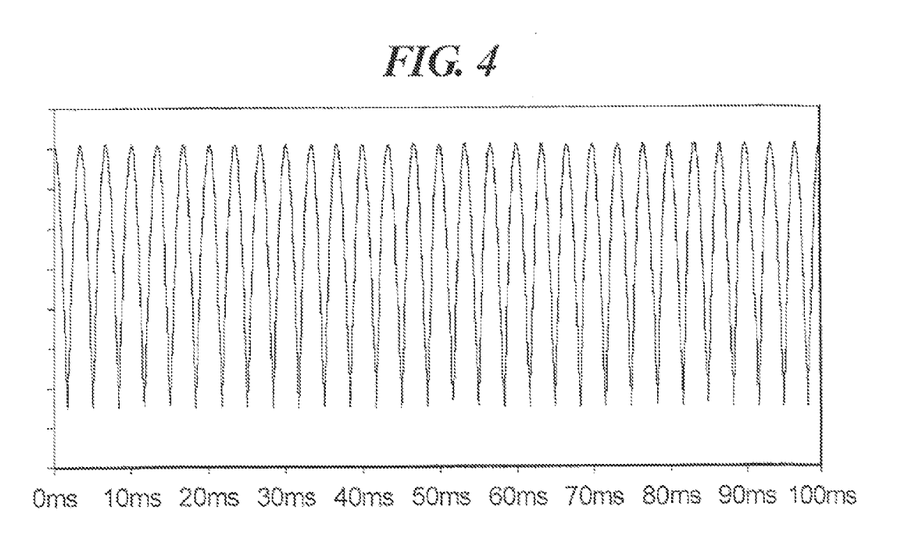
FIG. 4 shows the light output waveform of the three-phase-driven LED lighting of FIG. 3.

The light output from the LEDs in FIG. 3 is shown as a waveform in FIG. 4. As can be seen from FIG. 4, there is no off-time. Instead, there is a ripple at a rate of six times the line frequency. In most countries, this flicker is at 300 or 360 Hz, which theoretically cannot be perceived. The efficiency of the circuit shown in FIG. 3 is approximately 85%. Because only the resistor R1 is used to limit the current to the LED string S1, however, line voltage variations may cause the light output to change.

Figure 5:
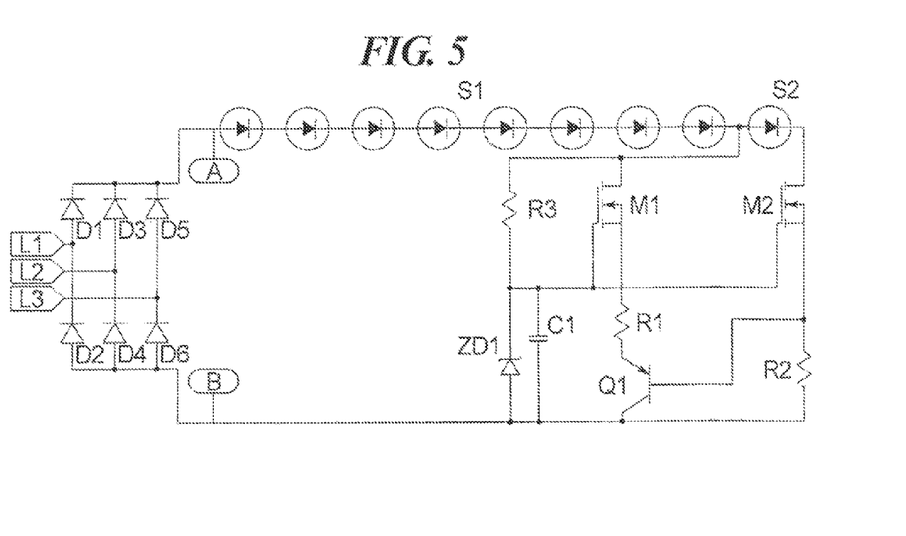
FIG. 5 is a circuit diagram of an embodiment of the invention wherein the driving circuitry includes commutating constant current sources.

In order to improve efficiency and current regulation, in a further embodiment of the driving circuitry according to the invention shown in FIG. 5, the driven LED string is divided into two sub-strings, with a forward voltage ratio of 8:1, and two constant current sources are provided to respectively drive the LED sub-strings.

Figure 6:
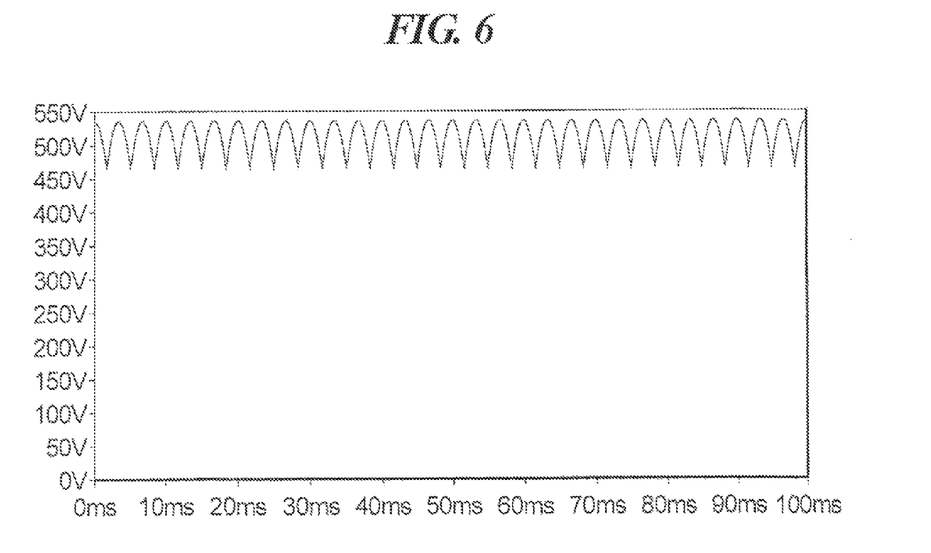
FIG. 6 shows the rectified three-phase voltage waveform used to operate the circuit shown in FIG. 5.

The driving circuitry shown in FIG. 5 also has a rectifier formed by diodes D1 through D6, connected to a three-phase source from which inputs L1, L2 and L3 are provided. Assuming that the three-phase source is a 380 V three-phase power source, the rectified three-phase voltage waveform across A and B of FIG. 5 is shown in FIG. 6.

Figure 7:
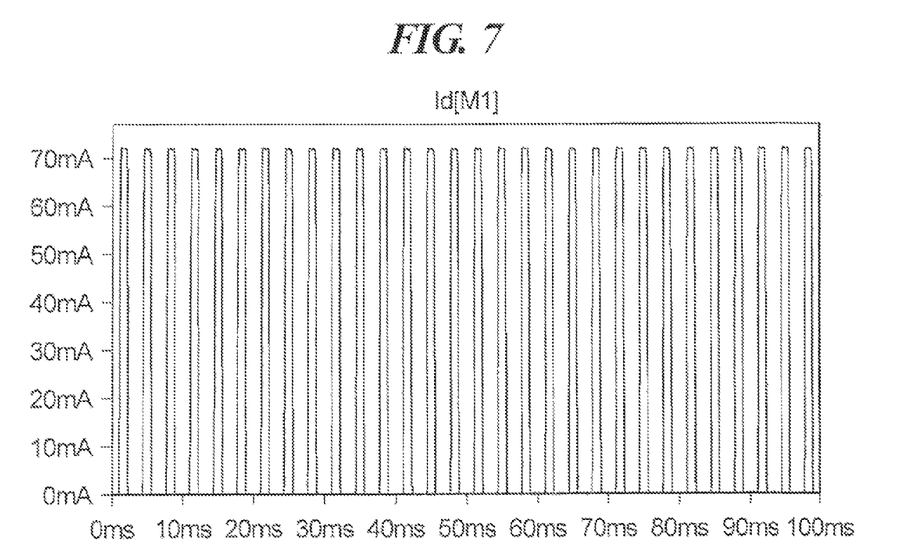
FIG. 7 shows the current waveform of a first of the two constant current sources shown in the circuit of FIG. 5.
Figure 8:
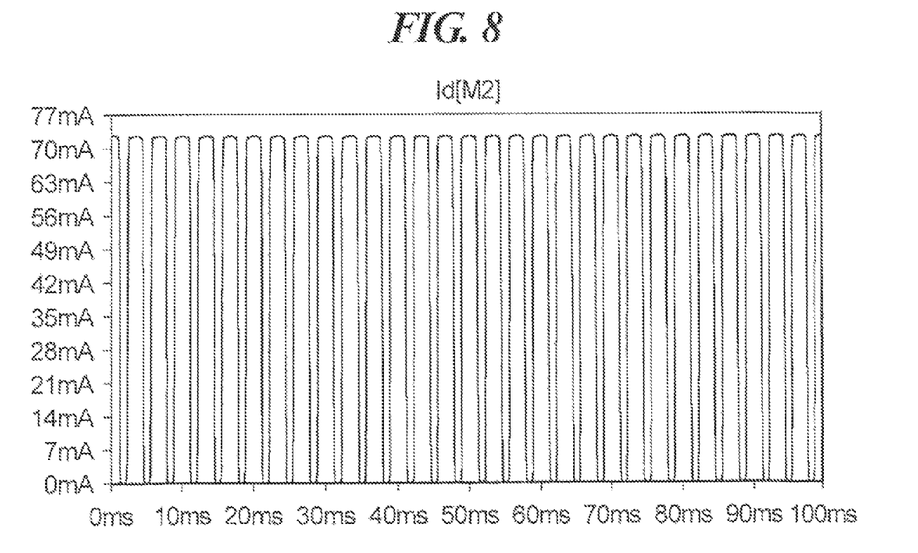
FIG. 8 shows the current waveform of a second of the two constant current sources shown in the circuit of FIG. 5.

The LED string S1 in the embodiment of FIG. 5 is formed by eight series-connected LEDs, with a forward voltage of 50 V each. A resistor R3, and Zener diode ZD1 and a capacitor C1 form a constant voltage source that biases the respective gates of field effect transistors M1 and M2. A current source formed by the transistor M1, the resistor R1, and a bipolar transistor Q1 is used to drive the LED string S1. When the voltage across A and B rises above 500 V, the additional LED string S2, which includes a single 50 V LED, begins to conduct through another current source that is formed by the transistor M2 and a resistor R2. As the voltage across A and B further increases, current through M2 reaches the regulated value, and the transistor M1 is turned off by the transistor Q1. FIGS. 7 and 8 show the current waveforms of the transistors M1 and M2, respectively. It should be noted that transistors M1 and M2 conduct in alternation according to the voltage change across A and B, thereby minimizing power loss. At low voltage, only the LED string S1 is conducting. At high voltage, both LED strings S1 and S2 are conducting.

Figure 9:
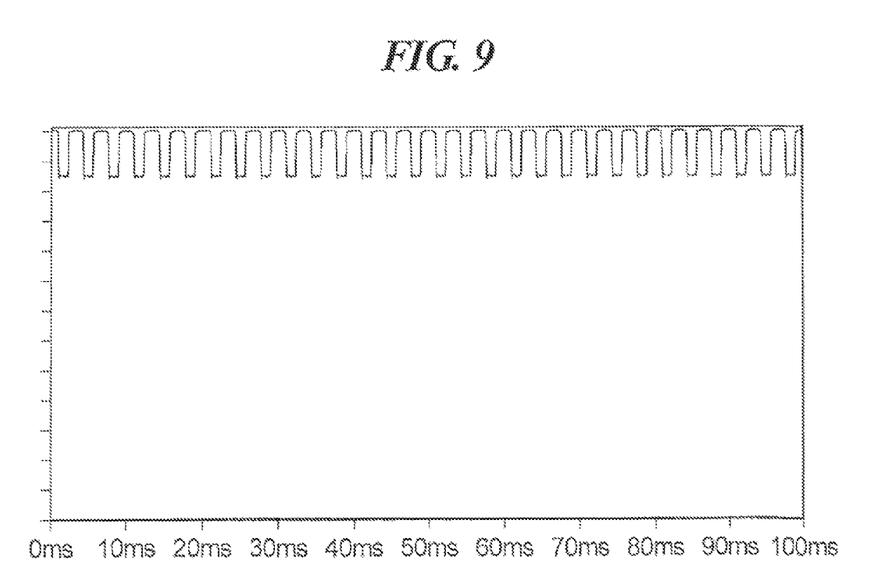
FIG. 9 shows the light output waveform of the LED string in the circuit of FIG. 5.

FIG. 9 shows the light output of the embodiment shown in FIG. 5. Compared to the light output of the embodiment of FIG. 3, which is shown in FIG. 4, it can be seen in FIG. 9 that the ripple is minimized to less than 8%. The efficiency is also improved to 95%.

Figure 10:
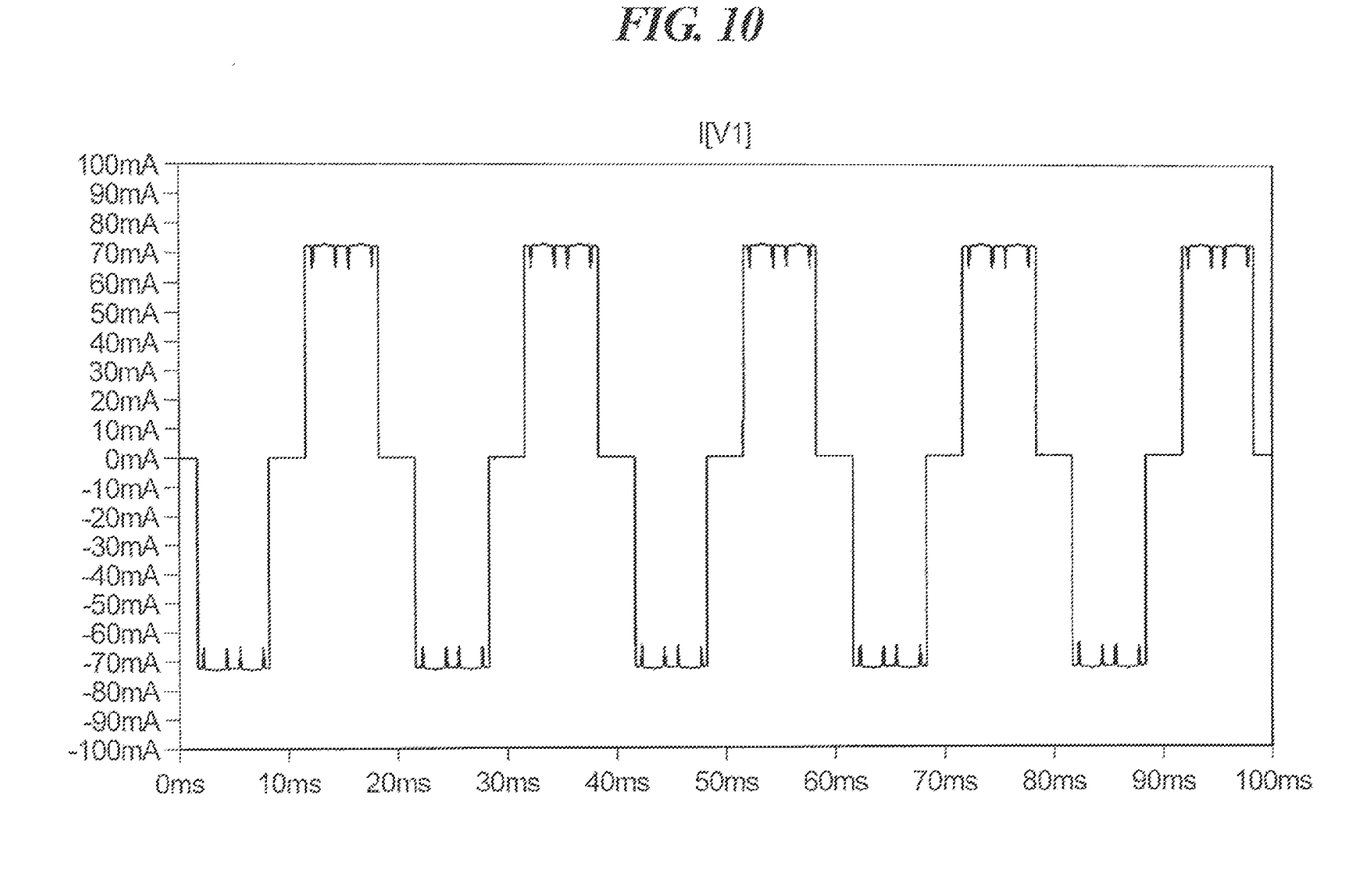
FIG. 10 shows the input current waveform of the phase L1 supplied to the circuit shown in FIG. 5.

FIG. 10 shows the input current waveform of L1. The other phases L2 and L3 will have the same waveform, but will be offset with respect to phase. With such input current waveforms, the power factor of the embodiment shown in FIG. 5 has a typical value of 0.95.

Figure 11:
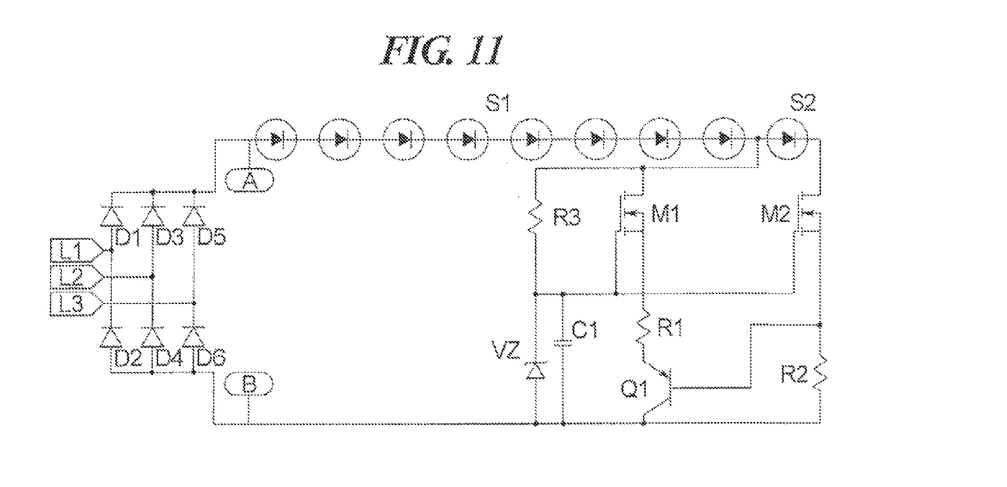
FIG. 11 is a schematic circuit diagram of a further embodiment of the invention, with level dimming.

FIG. 11 shows a modified circuit for level dimming. Zener diode ZD1 is replaced by a controllable voltage source to VZ. The LED current is proportional to the voltage of VZ.

Figure 12:
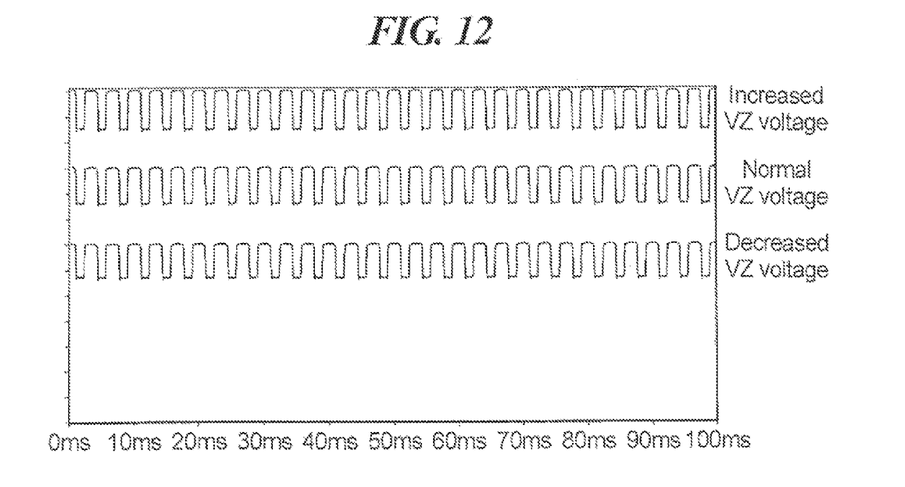
FIG. 12 shows light output waveforms for different voltages of the variable voltage source in the embodiment of FIG. 11.

FIG. 12 shows the effect of increasing or decreasing the voltage of VZ. This level dimming feature makes the circuit adaptable to conventional 0-10V lighting dimming.

Figure 13:
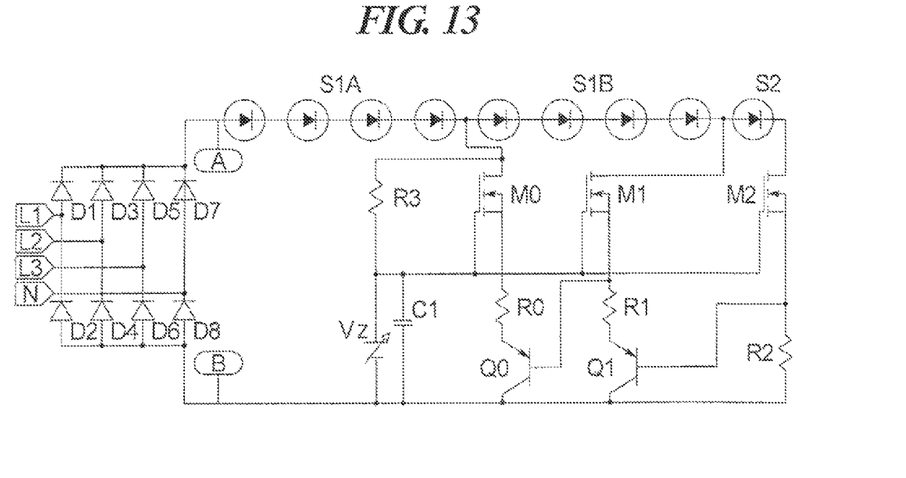
FIG. 13 is schematic circuit diagram of a further embodiment of the invention allowing operation either in a three-phase mode or in a single-phase mode.
Figure 14:
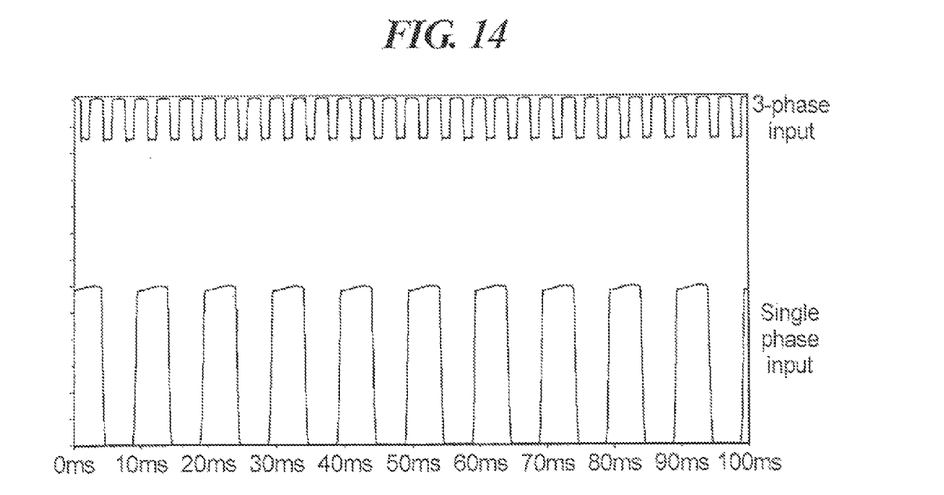
FIG. 14 shows the light output waveforms for the three-phase mode and the single phase mode, respectively, for the embodiment of FIG. 13.

FIG. 13 shows a circuit is operable with both 3-phase input and single phase input. In this case, the neutral input is required to be connected to the circuit. LED string S1 is further divided into substrings S1A and S1B. An additional current source formed by transistor M0, the resistor R0, and a bipolar transistor Q0 is used to drive the LED string S1A. With 3-phase input, this additional current source never conducts and the circuit operates as described for the circuit in FIG. 5. With only single phase input, e.g. phases L2 and L3 are disconnected, S1A is conducting when the rectified voltage is above 200V. Since the peak input voltage of a single phase is not high enough to make LED strings S1B and S2 conduct, only LED string S1A will be illuminated all the time. FIG. 14 shows the light waveforms of 3-phase input and single phase input. It should be noted that during single phase input, the light output is reduced and the ripple frequency is lowered with LED off-time. Normally, the circuit should operate in 3-phase input mode. The single phase operation is only for power fault conditions when 3-phase power is not available.

Although the embodiment shown in FIG. 13 makes use of a variable voltage source VZ for level dimming in accordance with the embodiment of FIG. 11, the circuit shown in FIG. 13 can also be designed with constant current sources, as in the embodiment of FIG. 5, by replacing the variable voltage source VZ with the Zener diode ZD1.

Although modifications and changes may be suggested by those skilled in the art, it is the intention of the inventor to embody within the patent warranted hereon all changes and modifications as reasonably and properly come within the scope of his contribution to the art.

What is claimed is:

1. Light emitting diode (LED) drive circuitry, comprising:
a rectifier comprising three inputs adapted for connection to a three-phase power source to respectively receive three-phase currents from said three-phase power source;
said rectifier comprising a plurality of diodes connected to rectify said three-phase currents to produce a DC voltage across two outputs of said rectifier;
a plurality of LEDs connected in series across said two outputs of said rectifier, and driven by said DC voltage produced by said rectifier at said two outputs, the plurality of LEDs including a first set, comprising multiple LEDs connected in series, and a second set, comprising at least one LED, said first set and said second set being connected in series to a first of said two outputs of said rectifier;
a first constant current source connected to a second of said two outputs of said rectifier and across said first set, said first constant current source including a first transistor having a control electrode;
a second constant current source connected to said second of said two outputs of said rectifier and across said second set, said second constant current source including a second transistor having a control electrode; and
a further transistor connected in series to said first transistor between said two outputs of said rectifier such that a same current flows through said first transistor and said further transistor and between said two outputs of said rectifier, and connected to said second transistor, said further transistor being configured to turn off said first transistor while said second transistor is conducting.

2. The LED driving circuitry as claimed in claim 1, further comprising a resistor connected between one of said two outputs of said rectifier, and said plurality of LEDs connected in series, that limits a current provided by said rectifier to said plurality of LEDs connected in series.

3. The LED driving circuitry as claimed in claim 1, wherein said first and second constant current sources are configured to alternatingly drive said first set and said second set dependent on said voltage across said two outputs of said rectifier.

4. The LED driving circuitry as claimed in claim 3, wherein said LED driving circuitry comprises:
a constant voltage source connected to the respective control electrodes of said first and second transistors that biases said control electrodes to place each of said first and second transistors in a conducting state.

5. The LED driving circuitry as claimed in claim 3, wherein said first and second sets have a forward voltage ratio with respect to each other of 8:1.

6. The LED driving circuitry as claimed in claim 1, wherein said LED driving circuitry comprises:
a variable voltage source connected across at least one of said first current source and said second current source; and
said first and second current sources and said variable voltage source being configured to alternatingly drive said first set and said second set dependent on said voltage across said two outputs of said rectifier and dependent on a selected voltage produced by said variable voltage source to selectively dim at least some LEDs in said plurality of LEDs.

7. The LED driving circuitry as claimed in claim 1, wherein said LED driving circuitry further comprises:
a third current source connected between said first current source and a node between said first and second subsets;
said rectifier comprising a fourth input adapted for connection to a neutral input; and
said third current source being non-conducting when said rectifier receives all three of said three phase currents, and said rectifier being configured to produce a rectified voltage that causes said third current source to be conducting when only one current is supplied to said rectifier at one of said three inputs, and said first current source then operating said first and second subsets in a single phase mode.

8. The LED driving circuitry as claimed in claim 7, wherein each of said first current source, said second current source and said third current source is a constant current source.

9. The LED driving circuitry as claimed in claim 7, further comprising a variable voltage source connected across at least said second current source, and said second current source operating at least said second subset dependent on a selected voltage produced by the variable voltage source to selectively dim at least said second subset.

10. A method for driving light emitting diodes (LEDs), comprising:
connecting three inputs of a rectifier to a three-phase power source to respectively receive three-phase currents at said three inputs from said three-phase power source;
in said rectifier rectifying said three-phase currents to produce a DC voltage across two outputs of said rectifier;

connecting a plurality of LEDs in series across said two outputs of said rectifier, and driving said LEDS with said DC voltage produced by said rectifier at said two outputs dividing plurality of LEDs into a first set, comprising multiple LEDs connected in series, and a second set, comprising at least one LED, said first set and said second set being connected in series to a first of said two outputs of said rectifier;

connecting a first constant current source to a second of said two outputs of said rectifier and across said first set, said first constant current source including a first transistor having a control electrode;

connecting a second constant current source to said second of said two outputs of said rectifier and across said second set, said second constant current source including a second transistor having a control electrode; and connecting a further transistor in series to said first transistor between said two outputs of said rectifier such that a same current flows through said first transistor and said further transistor and between said two outputs of said rectifier, and connecting said further transistor to said second transistor; and with said further transistor, turning off said first transistor while said second transistor is conducting.

11. The method as claimed in claim 10, further comprising connecting a resistor between one of said two outputs of said rectifier, and said plurality of LEDs connected in series, and with said resistor, limiting a current provided by said rectifier to said plurality of LEDs connected in series.

12. The method as claimed in claim 10, further comprising:
with said first and second constant current sources, alternatingly driving said first set and said second set dependent on said voltage across said two outputs of said rectifier.

13. The method as claimed in claim 12, said method further comprising:
connecting a constant voltage source to the respective control electrodes of said first and second transistors, and thereby biasing said control electrodes to place each of said first and second transistors in a conducting state.

14. The method as claimed in claim 12, further comprising dividing said plurality of LEDs into said first and second sets having a forward voltage ratio with respect to each other of 8:1.

15. The method as claimed in claim 10, further comprising:
connecting a variable voltage source across at least one of said first current source and said second current source; and
with said first and second current sources and said variable voltage source, alternatingly driving said first set and said second set dependent on said voltage across said two outputs of said rectifier and dependent on a selected voltage produced by said variable voltage source to selectively dim at least some LEDs in said plurality of LEDs.

16. The method as claimed in claim 10, wherein said rectifier comprises a fourth input adapted for connection to a neutral input, and wherein said method further comprises:

connecting a third current source between said first current source and a node between said first and second subsets;

via said rectifier, causing said third current source to be non-conducting when said rectifier receives all three of said three phase currents, and via said rectifier, producing a rectified voltage that causes said third current source to be conducting when only one current is supplied to said rectifier at one of said three inputs, and with said first current source, then operating said first and second subsets in a single phase mode.

17. The method as claimed in claim 16, further comprising forming each of said first current source, said second current source and said third current source as a constant current source.

18. The method as claimed in claim 16, further comprising connecting a variable voltage source connected across at least said second current source, and with said second current source, operating at least said second subset dependent on a selected voltage produced by the variable voltage source to selectively dim at least said second subset.

19. Light emitting diode (LED) drive circuitry, comprising:
a rectifier comprising three inputs adapted for connection to a three-phase power source to respectively receive three-phase currents from said three-phase power source, said rectifier comprising a plurality of diodes connected to rectify said three-phase currents to produce a DC voltage across two outputs of said rectifier;
a plurality of LEDs connected in series across said two outputs of said rectifier, and driven by said DC voltage produced by said rectifier at said two outputs, the plurality of LEDs including a first set, comprising multiple LEDs connected in series, and a second set, comprising at least one LED, said first set and said second set being connected in series to a first of said two outputs of said rectifier;
a first constant current source connected to a second of said two outputs of said rectifier and across said first set, said first constant current source including a first transistor having a control electrode;
a second constant current source connected to said second of said two outputs of said rectifier and across said second set, said second constant current source including a second transistor having a control electrode; and
a further transistor connected in series to said first transistor between said two outputs of said rectifier and electrically connected to said second transistor, said further transistor being configured to turn off said first transistor while said second transistor is conducting, wherein a source electrode of said first transistor is connected to an emitter electrode of said further transistor, a source electrode of said second transistor is connected to a base electrode of said further transistor, and a collector electrode of said further transistor is connected to a second output of said rectifier.

20. The LED driving circuitry as claimed in claim 19, wherein a drain electrode of said first transistor is connected to said first output of said rectifier via said first set of said plurality of LEDs, and a drain electrode of said second transistor is connected to said first output of said rectifier via said first set and said second set of said plurality of LEDs.

* * * * *